Dec. 23, 1952    H. H. BIXLER    2,622,407
TWO-TEMPERATURE REFRIGERATING SYSTEM
Filed Jan. 10, 1952

Inventor:
Harley H. Bixler,
by *Sheridan & Ross*
His Attorney.

Patented Dec. 23, 1952

2,622,407

UNITED STATES PATENT OFFICE 2,622,407

TWO-TEMPERATURE REFRIGERATING SYSTEM

Harley H. Bixler, Erie, Pa., assignor to General Electric Company, a corporation of New York Application January 10, 1952, Serial No. 265,812

3 Claims. (Cl. 62—8)

My invention relates to refrigerating systems and pertains more particularly to two-temperature refrigerating systems.

In any refrigerating system, it is desirable that the liquid refrigerant be supplied to the evaporator or evaporators as promptly as possible after the refrigerating unit in the system commences to operate. This is desirable from the standpoint of economical refrigerator operation since shorter refrigerating unit operating periods are then required to lower the temperatures in the food compartments. Also, by promptly supplying liquid refrigerant to the evaporators, the temperatures in the food compartments may be maintained within a narrower range.

In view of the above, the primary object of my invention is to provide in a two-temperature refrigerating system means effective for supplying liquid refrigerant to the evaporators thereof as promptly as possible after the refrigerating unit of the system commences to operate.

Further objects and advantages of my invention will become apparent as the following description proceeds and the features of novelty which characterize my invention will be pointed out with particularity in the claims annexed to and forming a part of this specification.

In carrying out the objects of my invention, I provide a vertical header divided into upper and lower chambers having a check valve therebetween. A freezer evaporator is connected to the upper chamber. A refrigerating unit supplies refrigerant to the lower chamber and during operating periods of the unit the check valve is closed. Pressure is then accumulated in the lower chamber and liquid refrigerant therein is supplied through a trap to a fresh food evaporator. Refrigerant from the fresh food evaporator flows through a conduit extending into the upper chamber for providing an injector to direct refrigerant into the freezer evaporator. Also, the check valve when closed permits liquid to collect in the bottom of the upper chamber for supplying the injector. When the refrigerating unit is idle, the check valve opens and the liquid in the upper chamber drains into the lower chamber.

Figure 1:
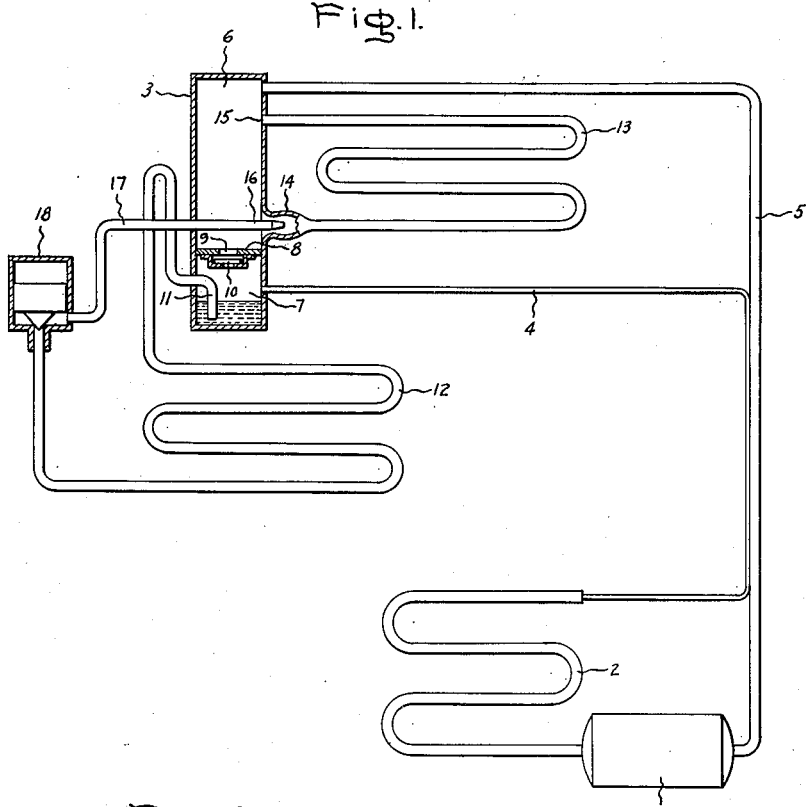
Figure 2:
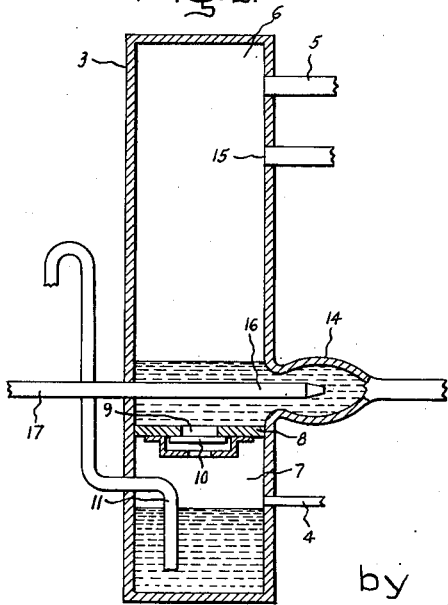

For a better understanding of my invention, reference may be had to the accompanying drawing in which Fig. 1 is a schematic drawing of a two-temperature refrigerating system illustrating an embodiment of my invention; and Fig. 2 is an enlarged sectional view of the header of the system shown in Fig. 1.

Referring to the drawing, I have shown in Fig. 1 a two-temperature refrigerating system including a refrigerating unit 1, a condenser 2 connected to the refrigerating unit, and a vertical header 3. Provided for connecting the lower portion of the header 3 with the condenser 2 is a capillary tube 4; and, provided for connecting the upper portion of the header 3 with the refrigerating unit 1 is a suction line 5. The capillary tube 4 and the suction line 5 are in heat exchange relationship. The vertical header 3 is divided into upper and lower chambers 6 and 7, respectively, by a horizontal partition 8. The lower chamber 7 is charged to normal level with a liquid refrigerant reserve.

Formed in the partition 8 to provide communication between the upper and lower chambers of the header 3 is an aperture 9. Provided for cooperating with the aperture 9 to form a check valve for controlling the communication between the upper and lower chambers is a disk 10. During idle periods of the refrigerating unit 1, the disk 10 is held by gravity in its lower position, as shown in Fig. 1, and the check valve is open. When the refrigerating unit 1 commences operating, refrigerant pressure in the lower chamber 7 raises the disk 10 to the position shown in Fig. 2 whereby the check valve is closed and communication between the chambers is blocked. This broad feature of controlling communication between upper and lower chambers in a header by means of a check valve is not my invention but is described and claimed in the copending application of Frank A. Schumacher, Serial No. 265,813, filed January 10, 1952, and assigned to the same assignee as the present application.

Provided for extending into the lower chamber 7 and to a point below the normal level of the liquid reserve therein is a trap 11. The trap 11 is an extension of one end of a fresh food evaporator 12. In the present system the evaporator 12 is located below the vertical header 3 and the trap 11 is employed to prevent drainage of the liquid reserve from the lower chamber 7 into the fresh food evaporator. It is to be understood that the system could be arranged with the fresh food evaporator at the same height or above the vertical header, in which case it would suffice merely to connect the fresh food evaporator to the lower chamber below the normal level of the liquid reserve therein. When the refrigerating unit 1 is operating and the pressure in the lower chamber 7 is effective for closing the check valve, the pressure on the surface of the liquid in the lower chamber forces the liquid refrigerant up through the trap 11 and into the fresh food evaporator 12. Thus, liquid refrigerant is promptly supplied to the evaporator 12.

Also included in the system is a freezer evaporator 13. An inlet side 14 of the freezer evaporator 13 is connected to the upper chamber 6 of the header 3 adjacent the partition 8. An outlet side 15 of the evaporator is connected to the upper chamber 6 adjacent both the top thereof and the connection to the upper chamber of the suction line 5.

In axial alignment with the inlet side 14 of the freezer evaporator 13 and cooperating therewith for providing an injector arrangement is a nozzle 16. The nozzle 16, as perhaps better seen in Fig. 2, is formed by an extension into the upper chamber 6 of a conduit 17. The conduit 17 is connected to the low pressure side of a weight-type pressure differential valve 18; and the high pressure side of the differential valve is connected to the fresh food evaporator 12.

When the differential valve 18 is opened by the pressure of the refrigerant in the fresh food evaporator 12, the refrigerant flows through the conduit 17 and is supplied by the injector, formed by the nozzle 16 and the inlet side 14, to the freezer evaporator 13. After flowing through the freezer evaporator, the refrigerant is expelled from the outlet side 15 thereof and into the upper chamber 6 of the header 3. The expelled refrigerant is in both vaporous and liquid forms. The vaporous refrigerant is returned to the refrigerating unit by the suction line 5. The liquid refrigerant, since the check valve is closed during operating periods of the refrigerating unit, is permitted to collect, in the manner shown in Fig. 2, in the bottom portion of the upper chamber 6. Thus, a liquid reserve is provided for the injector to supply to the freezer evaporator 16. When the refrigerating unit 1 becomes idle and pressure in the lower chamber 7 decreases, the check valve opens and liquid refrigerant collected in the upper chamber 6 is permitted to drain down into the lower chamber for replenishing the reserve therein.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States is:

1. A refrigerating system comprising a vertical header divided into upper and lower chambers, a refrigerating unit supplying liquid refrigerant to said lower chamber and exhausting vaporous refrigerant from said upper chamber, a freezer evaporator having both sides thereof connected to said upper chamber, a fresh food evaporator having one side thereof connected to said lower chamber and extending below the normal level of a liquid reserve therein, injecting means in said upper chamber directing refrigerant from said fresh food evaporator into said freezer evaporator, means providing communication between said upper and lower chambers, and controlling means operated in response to operation of said refrigerating unit to block communication between said chambers thereby to permit an accumulation of pressure in said lower chamber for the prompt supply of liquid refrigerant therefrom and the collection of liquid refrigerant in said upper chamber for supplying said injecting means, said controlling means affording communication between said chambers during idle periods of said refrigerating unit thereby to permit drainage of liquid refrigerant from said upper chamber into said lower chamber to replenish said liquid reserve in said lower chamber.

2. A refrigerating system comprising a vertical header divided into upper and lower chambers, a refrigerating unit supplying liquid refrigerant to said lower chamber and exhausting vaporous refrigerant from said upper chamber, a freezer evaporator having both sides thereof connected to said upper chamber, a fresh food evaporator having one side thereof connected to said lower chamber and extending below the normal level of a liquid reserve therein, injecting means in said upper chamber directing refrigerant from said fresh food evaporator into said freezer evaporator, and a check valve between said upper and lower chambers, said check valve closing during operation of said refrigerating unit thereby to permit accumulation of pressure in said lower chamber for the prompt supply of liquid refrigerant therefrom and the collection of liquid refrigerant in said upper chamber for supplying said injecting means, said check valve opening during idle periods of said refrigerating unit thereby to permit drainage of liquid refrigerant from said upper chamber into said lower chamber for replenishing said liquid reserve in said lower chamber.

3. A refrigerating system comprising a vertical header, a partition dividing said vertical header into upper and lower chambers, said partition including an aperture connecting said upper and lower chambers, a freezer evaporator having both the inlet and outlet sides thereof connected to said upper chamber, said inlet side of said freezer evaporator being connected to said upper chamber adjacent said partition, a fresh food evaporator having one side thereof connected to said lower chamber and extending below the normal level of a liquid reserve therein, a conduit connecting the other side of said fresh food evaporator with said upper chamber, a pressure differential valve connected in said conduit, an extension of said conduit extending into said upper chamber and cooperating with said inlet side of said freezer evaporator to form an injector directing refrigerant into said freezer evaporator, and a disk cooperating with said aperture in said partition to form a check valve, said check valve closing during operation of said refrigerating unit thereby to permit accumulation of pressure in said lower chamber for the prompt supply of liquid refrigerant therefrom and the collection of liquid refrigerant in said upper chamber for supplying said injector, said check valve opening during idle periods of said refrigerating unit thereby to permit drainage of liquid refrigerant from said upper chamber into said lower chamber for replenishing said liquid reserve in said lower chamber.

HARLEY H. BIXLER.

REFERENCES CITED

The following references are of record in the file of this patent:

UNITED STATES PATENTS

| Number | Name | Date |
| --- | --- | --- |
| 2,133,948 | Buchanan | Oct. 25, 1938 |
| 2,146,796 | Dasher | Feb. 14, 1939 |
| 2,146,797 | Dasher | Feb. 14, 1939 |
| 2,244,382 | Atchison | June 3, 1941 |